United States Patent
Fang

(10) Patent No.: US 10,346,424 B2
(45) Date of Patent: Jul. 9, 2019

(54) OBJECT PROCESSING

(71) Applicant: International Business Machines Corporation, Armonk, NY (US)

(72) Inventor: Min Fang, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 731 days.

(21) Appl. No.: 14/955,422

(22) Filed: Dec. 1, 2015

(65) Prior Publication Data
US 2017/0154090 A1 Jun. 1, 2017

(51) Int. Cl.
*G06F 16/27* (2019.01)
*H04L 29/08* (2006.01)

(52) U.S. Cl.
CPC .............. *G06F 16/27* (2019.01); *H04L 67/10* (2013.01); *H04L 67/1095* (2013.01)

(58) Field of Classification Search
CPC ......... G06F 17/30174; G06F 17/30575; G06F 17/30345; G06F 17/30312; G06F 17/30371; G06F 17/30377; G06F 17/30598; G06F 17/3053; G06F 16/27; H04L 67/10; H04L 67/1095
USPC .................. 707/620, 626, 609, 752, 999.001
See application file for complete search history.

(56) References Cited

U.S. PATENT DOCUMENTS

| | | | |
|---|---|---|---|
| 6,591,272 B1* | 7/2003 | Williams | G06F 17/30607 |
| 8,756,656 B1* | 6/2014 | Hartmann | H04L 63/1408 |
| | | | 713/156 |
| 8,849,761 B2 | 9/2014 | Prahlad et al. | |
| 8,990,257 B2 | 3/2015 | Barton et al. | |
| 9,465,821 B1* | 10/2016 | Patiejunas | G06F 17/30289 |
| 2007/0156677 A1* | 7/2007 | Szabo | G06F 17/30522 |
| 2008/0115083 A1* | 5/2008 | Finkelstein | G06F 16/954 |
| | | | 715/805 |
| 2010/0070486 A1* | 3/2010 | Punaganti Venkata | G06F 16/248 |
| | | | 707/722 |
| 2010/0082646 A1* | 4/2010 | Meek | G06F 17/3056 |
| | | | 707/752 |
| 2010/0333116 A1* | 12/2010 | Prahlad | G06F 17/30082 |
| | | | 719/328 |
| 2013/0117240 A1 | 5/2013 | Taylor et al. | |
| 2013/0339311 A1* | 12/2013 | Ferrari | G06Q 30/0627 |
| | | | 707/687 |
| 2014/0310557 A1 | 10/2014 | Chambliss et al. | |
| 2014/0379988 A1 | 12/2014 | Lyakhovitskiy et al. | |
| 2015/0278283 A1* | 10/2015 | O'Krafka | G06F 17/30327 |
| | | | 707/609 |
| 2016/0062837 A1* | 3/2016 | Slik | G06F 11/1076 |
| | | | 714/6.24 |

OTHER PUBLICATIONS

Chengxiang, Si, "The Research on Cache Management of Cloud Storage", International Journal of Chaotic Computing (IJCC), vol. 1, Issues 1-4, Mar.-Dec. 2012, Copyright © 2012, Infonomics Society, pp. 14-21.

\* cited by examiner

*Primary Examiner* — Dung K Chau
(74) *Attorney, Agent, or Firm* — David B. Woycechowsky

(57) ABSTRACT

A computer-implemented method comprises composing a plurality of objects and a metadata object into a complex object at a first node. The metadata object refers to the plurality of objects in the complex object. The method further comprises transmitting the complex object to a second node.

15 Claims, 7 Drawing Sheets

OBJECT PROCESSING

BACKGROUND

The present invention relates to information object processing.

In order to leverage network bandwidth when transferring data and reduce input/output (I/O) counts, a known way is collecting block data in cache as a log structure. In the log structure, data objects are arranged one by one (that is, sequentially). A "source" then transmits the log structure to communicate the data objects to a "destination." In this method, synchronization between addresses of the data in the source and destination is maintained so as to recover local data when a local system crashes.

SUMMARY

According to an aspect of the present invention, there is a method, computer program product and or system that performs the following operations (not necessarily in the following order): (i) generating a first metadata object including first metadata information referring to a first plurality of objects; (ii) composing, at a first node, a first complex object including the first plurality of objects and the first metadata object; and (iii) transmitting the first complex object from the first node to a second node.

DETAILED DESCRIPTION

According to one embodiment of the present invention, there is provided a computer-implemented method that includes: (i) composing a plurality of objects and a metadata object into a complex object at a first node; and (ii) transmitting the complex object to a second node. The metadata object refers to the plurality of objects in the complex object.

According to another embodiment of the present invention, there is provided a system including: (i) one or more processors; (ii) a memory coupled to at least one of the processors; and (iii) a set of computer program instructions stored in the memory. The set of computer program instructions are executed by at least one of the processors in order to perform actions of: (i) composing a plurality of objects and a metadata object into a complex object; and (ii) transmitting the complex object to a second node. The metadata object refers to the plurality of objects in the complex object.

According to still another embodiment of the present invention, there is provided a computer program product for object processing. The computer program product includes a computer readable storage medium having program instructions embodied therewith. The program instructions are executable by a processor to cause the processor to: (i) compose a plurality of objects and a metadata object into a complex object; and (ii) transmit the complex object to a second node. The metadata object refers to the plurality of objects in the complex object.

Some embodiments will be described in more detail with reference to the accompanying Figures. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
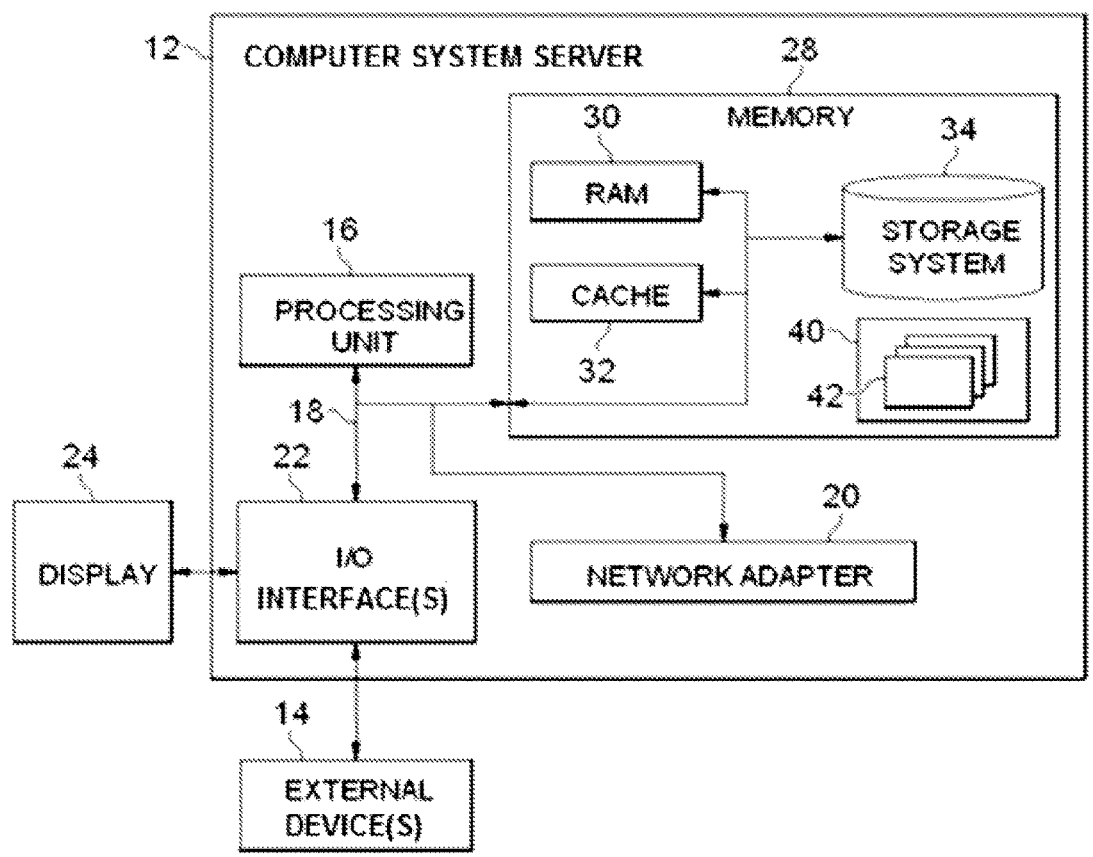
FIG. 1 depicts a cloud computing node used in a first embodiment of a system according to the present invention.

Referring now to FIG. 1, in which a computer system server 12 is shown, which is applicable to some embodiments of the present invention. Computer system server 12 is only illustrative and is not intended to suggest any limitation as to the scope of use or functionality of embodiments of the invention described herein.

As shown in FIG. 1, computer system server 12 is shown in the form of a general-purpose computing device. The components of computer system server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include industry standard architecture (ISA) bus, micro channel architecture (MCA) bus, enhanced ISA (EISA) bus, video electronics standards association (VESA) local bus, and peripheral component interconnect (PCI) bus.

Computer system server 12 typically includes a variety of computer system readable media. Such media may be any available media that is accessible by computer system server 12, and it includes both volatile and non-volatile media, removable and non-removable media.

System memory 28 can include computer system readable media in the form of volatile memory, such as random access memory (RAM) 30 and/or cache memory 32. Computer system server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (for example, a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (for example, at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system server 12 may also communicate with one or more external devices 14 such as a keyboard, a pointing device, a display 24, etc.; one or more devices that enable a user to interact with computer system server 12; and/or any devices (for example, network card, modem, etc.) that enable computer system server 12 to communicate with one or more other computing devices. Such communication can occur via input/output (I/O) interface(s) 22. Still yet, computer system server 12 can communicate with one or more networks such as a local area network (LAN), a general wide area network (WAN), and/or a public network (for example, the internet) via network adapter 20. As depicted, network adapter 20 communicates with the other components of computer system server 12 via bus 18. It should be understood that although not shown, other hardware and/or software components could be used in conjunction with computer system server 12. Examples include, but are not limited to: microcode, device drivers, redundant processing units, external disk drive arrays, redundant array of independent disks (RAID) systems, tape drives, and data archival storage systems, etc.

Figure 2:
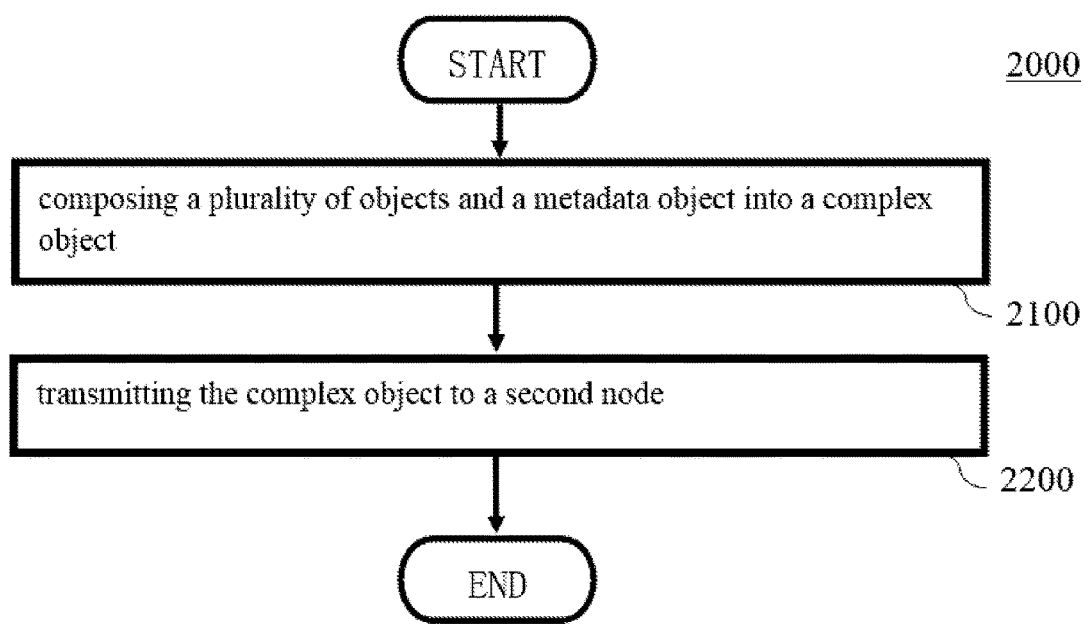
FIG. 2 is a flowchart showing a first embodiment method performed, at least in part, by the first embodiment system.

FIG. 2 shows a flowchart of method 2000 performed by a node according to some embodiments of the present invention.

Figure 4:
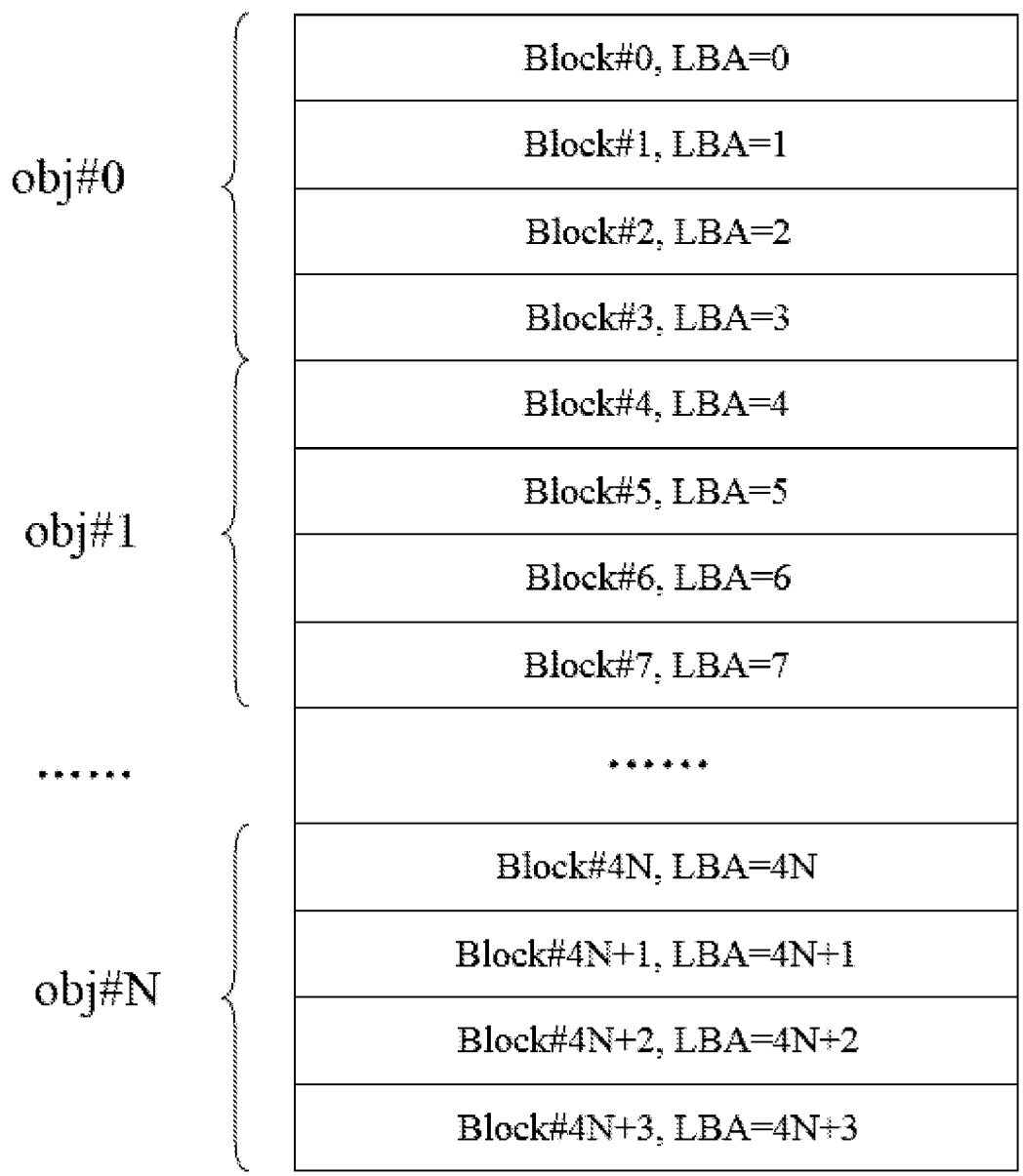
FIG. 4 is a block diagram of a data structure showing information that is helpful in understanding embodiments of the present invention.

Method 2000 can be performed by a first node, for example, a client, or a cloud gateway in the cloud storage context, so as to transmit data with limited network bandwidth and/or reduce the times of input/output (I/O) operations of the first node. In the storage device (for example, the disk) of the first node, data are often organized as logical blocks to facilitate accessing and storing. A logical block can be addressed by its corresponding logical block address (LBA). For example, LBA=1 can refer to the first logical block, LBA=2 can refer to the second logical block, etc. A data object can be comprised of several sequential logical blocks and has a unique identifier, such as obj#1, obj#2 and so on. For example, FIG. 4 shows a mapping relationship between objects and logical blocks according to an embodiment of the present invention. As shown in FIG. 4, a data object obj#0 includes logical blocks at LBA=0, LBA=1, LBA=2, and LBA=3, and data object obj#1 includes logical blocks at LBA=4, LBA=5, LBA=6 and LBA=7. In general, data object obj#N can be comprised of logical blocks at LBA=4×N, LBA=(4×N)+1, LBA=(4×N)+2 and LBA=(4×N)+3, where N is an integer. In this example, the size of a data object is four times larger than the size of the logical block. Other size relationships between a data object and a logical block are also applicable. In some embodiments of the present invention, processing is performed in the data object space (that is, processing is done in the unit of data object). However, the foregoing statement is intended only for illustrative purpose and not for limitation.

At operation 2100, a plurality of objects and a metadata object are composed into a complex object. The metadata object refers to the plurality of objects in the complex object.

In some embodiments of the present invention, a plurality of objects are selected. The plurality of objects are selected arbitrarily. Alternatively, the plurality of objects are selected according to defined criteria. In some embodiments, the plurality of objects are composed, based at least in part, on their cold rank. For example, objects with the same cold rank can be selected to be composed into one complex object. The term "cold rank" of an object refers to the frequency with which the object is accessed. For example, objects that are never accessed by the operating system are in a same cold rank, while objects that are accessed once a day by the operating system may be in another cold rank. Since objects in a given cold rank often have a high data relevance, composing them together may help to improve I/O efficiency. In some embodiments, statistics for accesses to the objects are stored locally. Alternatively, statistics for accesses to the objects are stored locally and/or at another node for redundancy.

In some embodiments of the present invention, cold objects, which are accessed infrequently by the operating system, are sent to a server, while hot objects, which are accessed relatively frequently, are retained locally to enhance access efficiency. In general situations, it is not necessary to compose continuous objects into a complex object. However, in some embodiments, continuous objects are selected and composed into a complex object if there are many objects in the same cold rank, since continuous objects are often have relevance.

In some embodiments of the present invention, after objects to be composed into a complex object are selected, a metadata object is created to describe which objects will be composed into the complex object. In some embodiments, the metadata object comprises the identifiers of the plurality of objects in the complex object. The identifier of each object is unique, and is based on: (i) the LBAs of the logical blocks contained in the object; and (ii) a size of the object. For example, the identifier of an object can be obj#n (n=0, 1, . . . N, where N is an integer), and n can be determined according to formula [1]:

$$n=[LBA \times size_{blk}/size_{obj}] \quad (1)$$

where:

LBA is the logical block address of any logical block contained in the object $size_{blk}$ is the size of the logical block which is specific to the storage device $size_{obj}$ is the size of the objects which can be defined as desired, and the function [x] takes the value of the largest integer not larger than x.

For example, let LBA=4, $size_{blk}$=1 Mbyte, $size_{obj}$=4 Mbytes, then the identifier of the object containing the logical block at LBA=4 will be obj#1. It is noted that if LBA=4, 5, 6 or 7, the result is the same object identifier (obj#1), since it has been assumed that an object is made up of four logical blocks.

In some embodiments of the present invention, the relationship between LBAs and object identifiers is simplified, since a mapping table is not needed.

In some embodiments, the size of a complex object, (that is, the number of objects contained in a complex object) is based on dynamically changing throughput. In particular, the size of the complex object is not static and is determined by a test process performed periodically. For example, in the test process, complex objects with different sizes are sent and the throughput for each size is calculated. The size resulting in the maximum throughput is chosen as the complex object size until the next test period.

At operation 2200, the complex object is transmitted to a second node. In some embodiments of the present invention, the complex object is put into a transfer buffer of the first node, and the metadata object is put at the start position of the transfer buffer. The transmission is performed using any communication means already known in the art or developed in the future.

In some embodiments of the present invention, after the complex object is received at the second node, it is decomposed so that the original objects and the metadata object are restored at the second node.

In some embodiments, a first node requests an object from the second node. In response, the second node accesses the requested object to determine which decomposed metadata object is referred to by the requested object. A new complex object is generated and transmitted to the first node from the second node, and received by the first node. The new complex object is composed of the decomposed metadata object and at least one object referred to by the decomposed metadata object.

Figure 3:
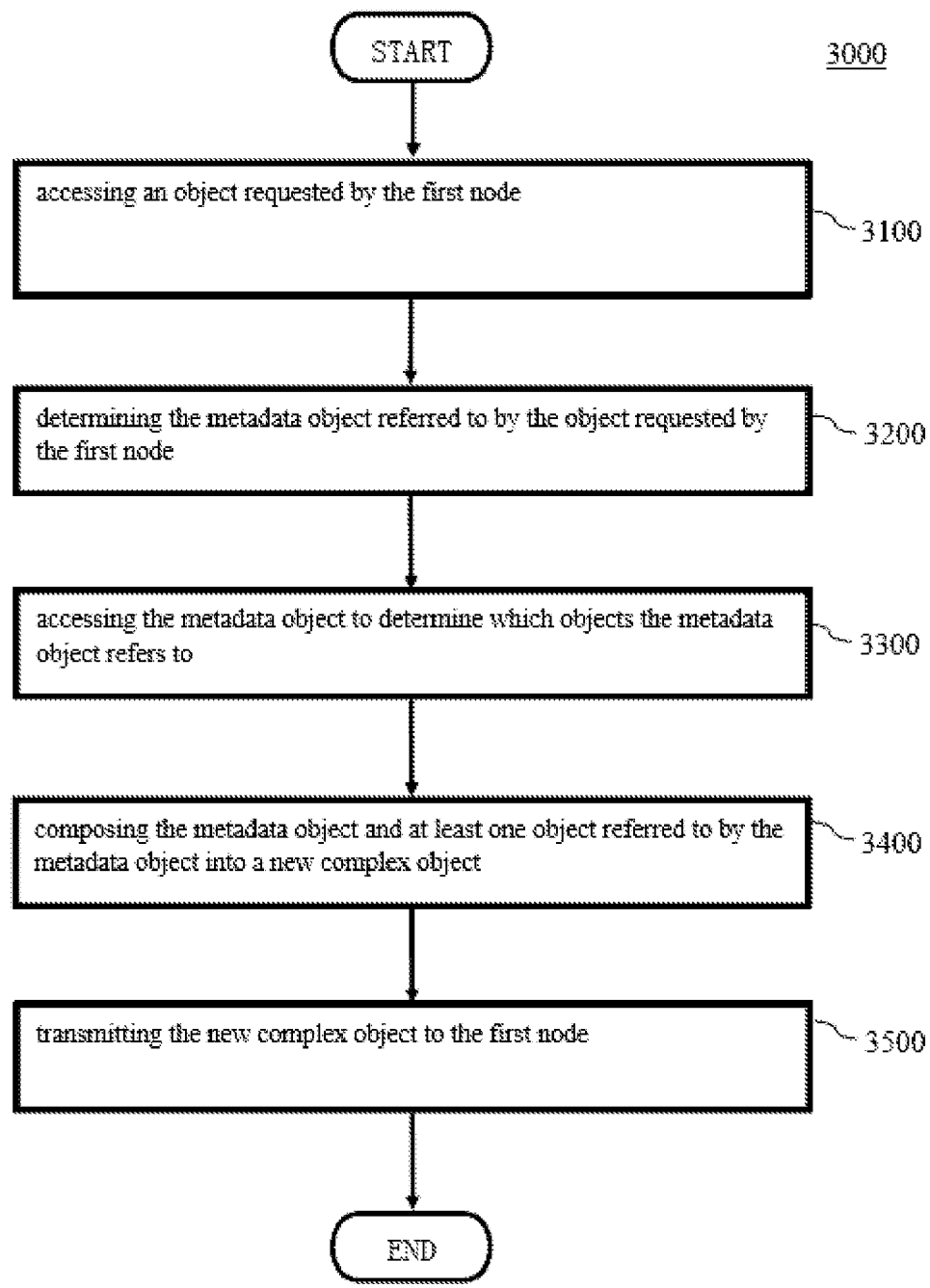
FIG. 3 is a flowchart showing a second embodiment method performed, at least in part, by the first embodiment system.

Processing the decomposed original objects and the decomposed metadata object at the second node will be illustrated now with reference to FIG. 3. FIG. 3 shows a flowchart of the method 3000 performed by the second node according to an embodiment of the present invention.

At operation 3100, in response to a request made by the first node, the second node accesses the object requested by the first node. The first node requests an object by designating the object's identifier. In response to this request, the second node searches the object with the designated identifier at its storage space.

At operation 3200, the second node determines the metadata object referred to according to the object requested by the first node. As described above, the metadata object was generated to refer to which objects are composed into the complex object. Meanwhile, each object also refers to its metadata object. With this cross-reference relationship, it is a simple matter to find the metadata object for a requested object.

At operation 3300, the second node accesses the determined metadata object, so as to determine which objects the metadata object refers to. As described above, the metadata object refers to the objects being composed together with it. If a metadata object can be determined, the objects originally composed together with it can be determined.

At operation 3400, the metadata object and at least one object referred to by the metadata object can be composed into a new complex object. The complex object is called a new complex object because it is not necessary for the complex object to include all the original objects in the original complex object. In contrast, only some related objects can be picked up. The related objects may be objects having consecutive identifiers and thus consecutive logical block addresses, which will be described in detail below. Since objects with consecutive logical block addresses are often requested together, a certain reasonable prediction can be obtained, so as to improve the transmission efficiency. Certainly, the object requested by the first node should be in the new complex object.

At operation 3500, the new complex object is transmitted to the first node. This can be done by putting the new complex object into the transfer buffer of the second node. In some embodiments, the metadata object is put at the start position of the transfer buffer. The transmission can be performed using any communication means already known in the art or developed in future.

Figure 5:
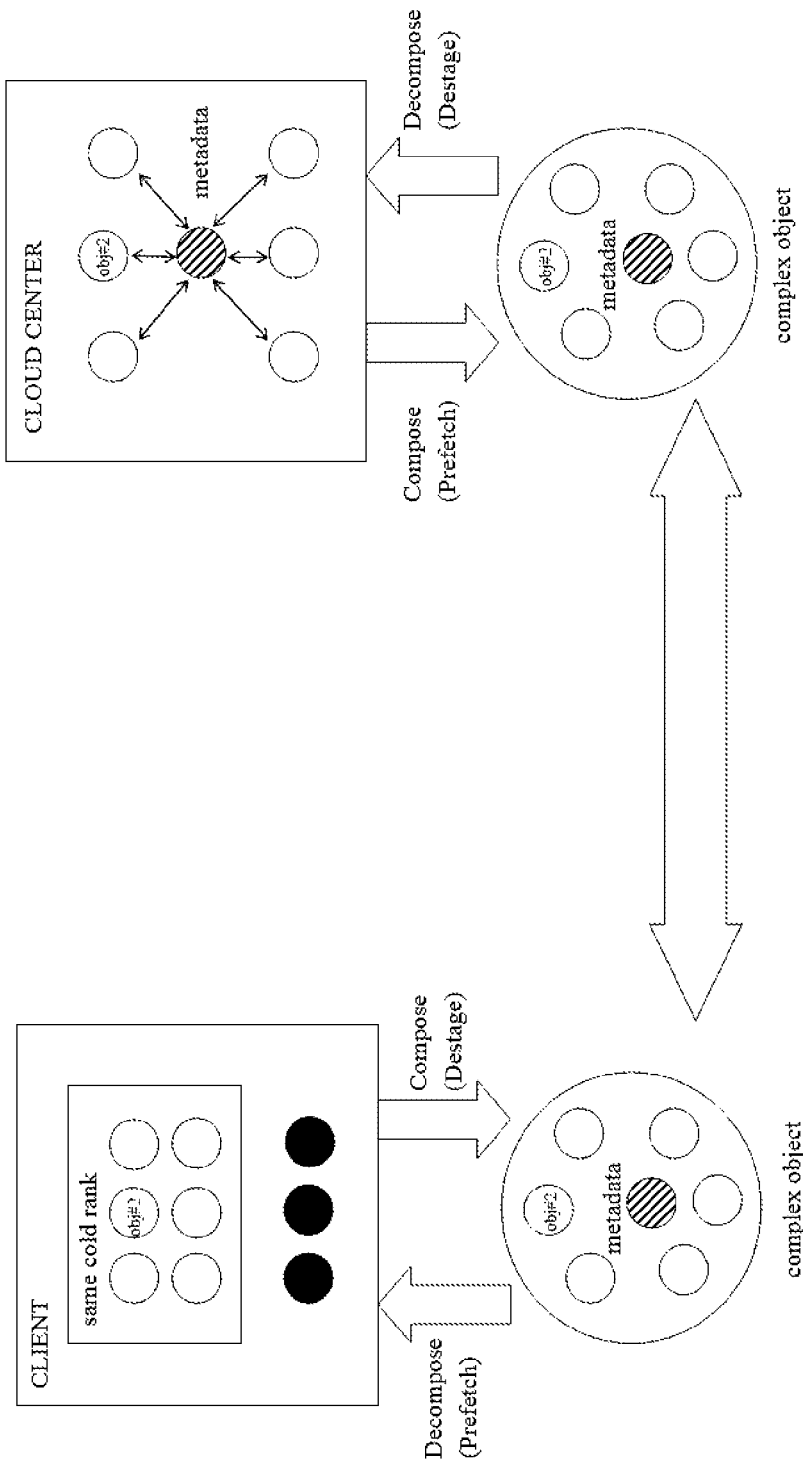
FIG. 5 is a block diagram of a second embodiment of a system according to the present invention.

With reference now to FIG. 5, FIG. 5 shows an example of the object processing according to an embodiment of the present invention. The example as shown in FIG. 5 can be used in the context of cloud storage.

As shown in FIG. 5, at the client side, objects (for example, object obj#2) in the same cold rank, are composed into a complex object together with a metadata object. These objects and the metadata object have a relationship of cross-reference. The complex object is then transmitted to a cloud center operated, for example, by a cloud provider. At the cloud center, the complex object is decomposed into the original objects and the metadata object. They are stored in the storage space of the cloud center. The decomposition process is called "destage" in the cloud storage context.

In some embodiments of the present invention, when the client needs to access data stored in the cloud center, it makes a request to the cloud center. For example, assume that the client needs to access the logical block at LBA=9. The client determines to which object the logical block belongs. This is computed using formula [1]. Assuming that the $size_{blk}$=1M bytes, $size_{obj}$=4M bytes, formula [1] yields: n=[9×¼]=2. Therefore, the identifier of the object that contains the logical block at LBA=9 is object obj#2.

Upon receiving the request for the object obj#2 from the client, the cloud center searches its storage space and finds the object obj#2. By looking up the reference field of object obj#2, the cloud center determines the metadata object associated with object obj#2. The cloud center then accesses the metadata object to find other objects it refers to. After that, the cloud center composes the metadata object and the objects referred to by the metadata object, including object obj#2, into a new complex object and transmits the new complex object to the client. The client receives the new complex object and decomposes it to obtain the original objects including the requested object obj#2. Now the object obj#2 is available at the client side. This process is called "prefetch" in the context of cloud storage.

The method described above simplifies the destage and prefetch processes in the cloud storage, so that the cloud service can be promoted.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention can be also implemented in a cloud computing environment. Cloud computing is a model of service delivery for enabling convenient, on-demand network access to a shared pool of configurable computing resources (for example networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Explanations and/or definitions of certain features of some embodiments of the present disclosure will be discussed in the following paragraphs.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (for example, mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Explanations of some Service Models used in some embodiments of the present disclosure will be discussed in the following paragraphs.

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Explanations of some Deployment Models used in some embodiments of the present disclosure will be discussed in the following paragraphs.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
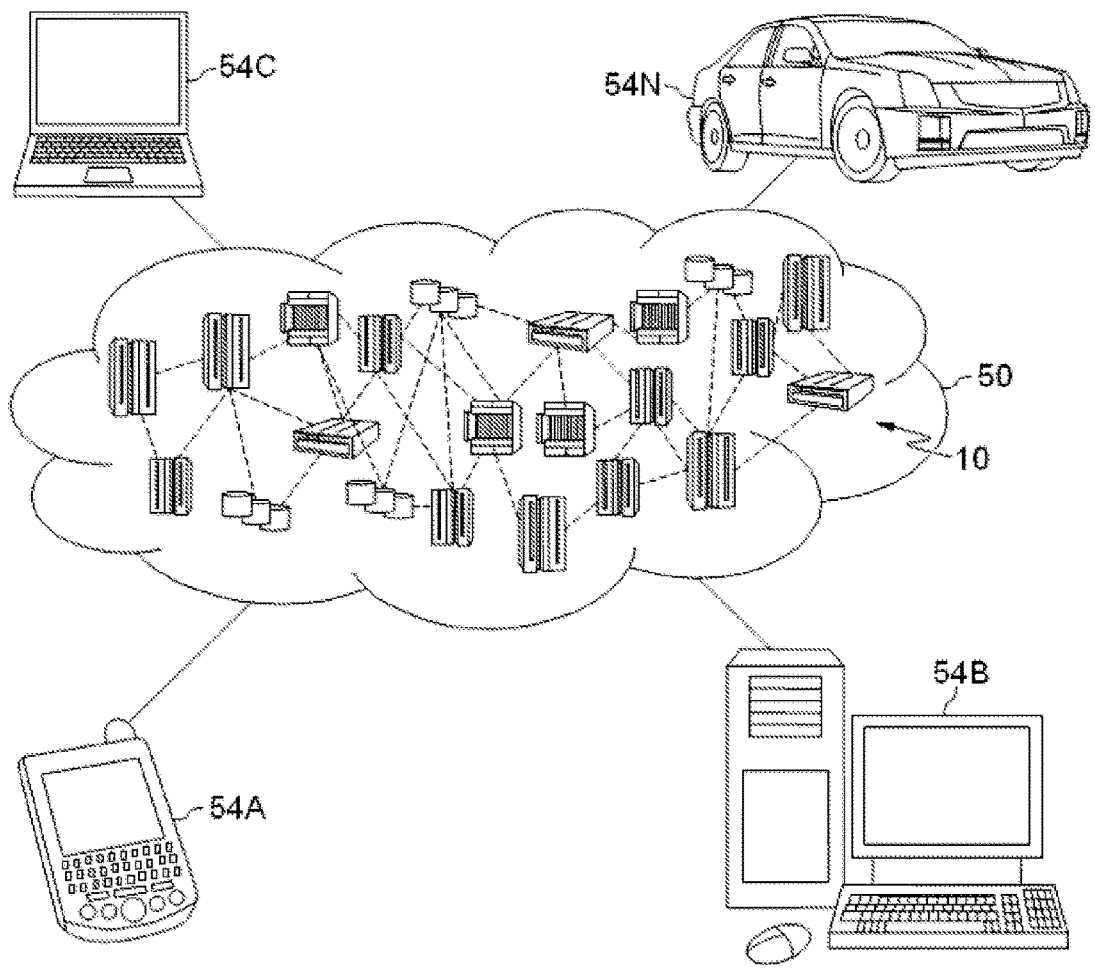
FIG. 6 depicts an embodiment of a cloud computing environment (also called the "first embodiment system") according to the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (for example, using a web browser).

Figure 7:
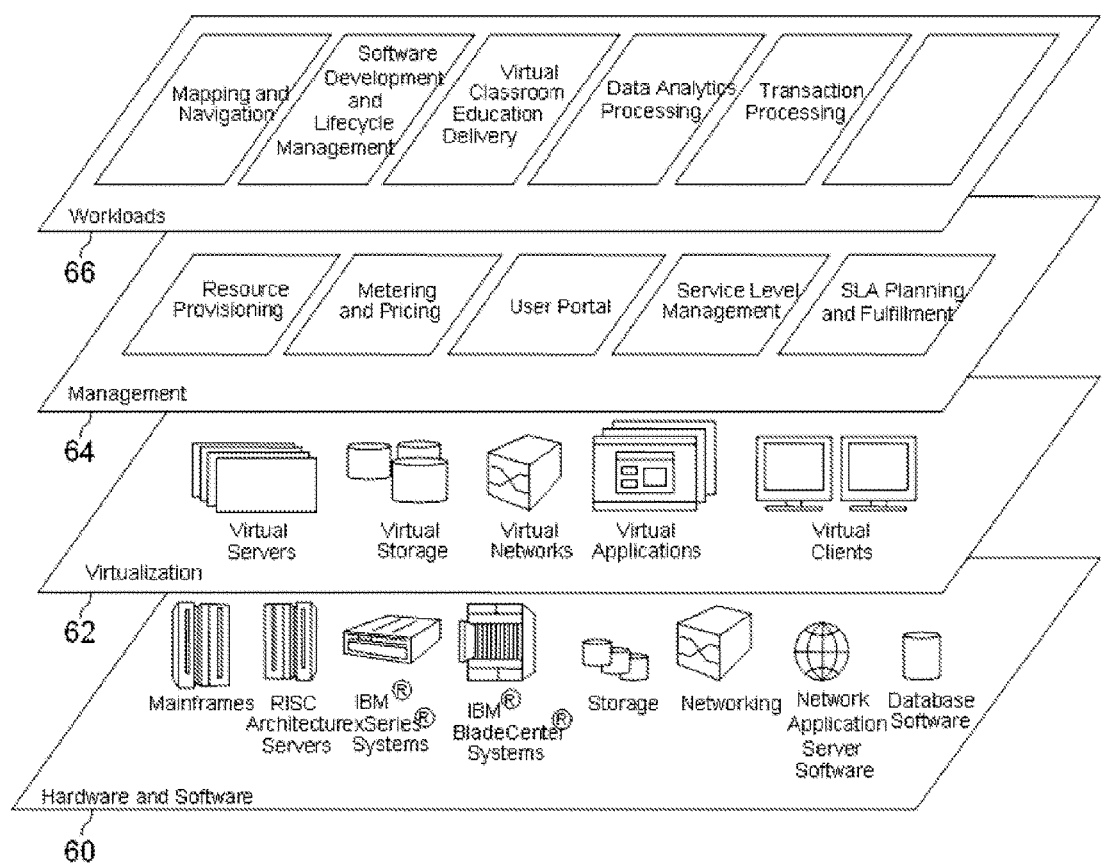
FIG. 7 depicts abstraction model layers used in the first embodiment system.

Referring now to FIG. 7, a set of functional abstraction layers provided by cloud computing environment 50 (FIG. 7) is shown. It should be understood in advance that the components, layers, and functions shown in FIG. 7 are intended to be illustrative only and embodiments of the invention are not limited thereto. Layers and corresponding functions used in the embodiment of FIG. 7 will be discussed in the following paragraph(s).

Hardware and software layer 60 includes hardware and software components. Examples of hardware components include mainframes; RISC (Reduced Instruction Set Computer) architecture based servers; conventional server computers; blade type servers; storage devices; networks and networking components. Examples of software components include network application server software; and database software, including conventional relational database software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation;

software development and lifecycle management; virtual classroom education delivery; data analytics processing; transaction processing, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, at a first computing device, a plurality of data objects, with each data object being made up of a plurality of N blocks, and with the objects being made up of data collected in a cache as a log structure;
   receiving an access history data set including information indicative of a heat rank for each data object, with the heat rank of a given data object being indicative of how often the given data object has been accessed;
   grouping the data objects into a plurality of object groups such that all objects in each object group has the same heat rank; and
   for each given object group:
      generating complex object metadata including information identifying the data objects making up the given object group,
      composing, at a first node, a complex object including the data objects of the given object group and the complex object metadata associated with the given object group;
      determining a cold rank complex object subset of the complex objects such that each complex object of the subset is made up of a plurality of data objects having a heat rank that is below a predetermined threshold; and
      transmitting, from the first computing to a second computing device, the complex objects of the cold rank complex object subset.

2. The computer-implemented method according to claim 1 wherein the plurality of N blocks making up each data object have consecutive Logical Block Addresses.

3. The computer-implemented method according to claim 2 wherein N is equal to four.

4. The computer-implemented method according to claim 1, wherein each given data object's heat rank is the number of accesses to which the given data object has been subject.

5. The computer-implemented method according to claim 1 further comprising:
   receiving, by the second computing device, over a communication network and from the first computing device, the complex objects of the cold rank complex object subset; and
   for each given complex object of the cold rank complex object subset:
      decomposing, by the second computing device, the given complex object into its constituent plurality of data objects, and
      storing the constituent plurality of data objects.

6. A computer program product (CPP) comprising:
   a non-transitory machine readable storage device; and
   computer code stored on the machine readable storage device, with the computer code including instructions for causing a processor(s) set to perform operations including the following:
      receiving, at a first computing device, a plurality of data objects, with each data object being made up of a plurality of N blocks, and with the objects being made up of data collected in a cache as a log structure,
      receiving an access history data set including information indicative of a heat rank for each data object, with the heat rank of a given data object being indicative of how often the given data object has been accessed,
      grouping the data objects into a plurality of object groups such that all objects in each object group has the same heat rank, and
      for each given object group:
         generating complex object metadata including information identifying the data objects making up the given object group,
         composing, at a first node, a complex object including the data objects of the given object group and the complex object metadata associated with the given object group,
         determining a cold rank complex object subset of the complex objects such that each complex object of the subset is made up of a plurality of data objects having a heat rank that is below a predetermined threshold, and
         transmitting, from the first computing to a second computing device, the complex objects of the cold rank complex object subset.

7. The CPP according to claim 6 wherein the plurality of N blocks making up each data object have consecutive Logical Block Addresses.

8. The CPP according to claim 7 wherein N is equal to four.

9. The CPP according to claim 6, wherein each given data object's heat rank is the number of accesses to which the given data object has been subject.

10. The CPP according to claim 6 wherein the computer code further includes instructions for causing the processor(s) set to perform the following operations:
    receiving, by the second computing device, over a communication network and from the first computing device, the complex objects of the cold rank complex object subset; and for each given complex object of the cold rank complex object subset:
  decomposing, by the second computing device, the given complex object into its constituent plurality of data objects, and
  storing the constituent plurality of data objects.

11. A computer system (CS) comprising:
a processor(s) set;
a machine readable storage device; and
computer code stored on the machine readable storage device, with the computer code including instructions for causing the processor(s) set to perform operations including the following:
  receiving, at a first computing device, a plurality of data objects, with each data object being made up of a plurality of N blocks, and with the objects being made up of data collected in a cache as a log structure,
  receiving an access history data set including information indicative of a heat rank for each data object, with the heat rank of a given data object being indicative of how often the given data object has been accessed,
  grouping the data objects into a plurality of object groups such that all objects in each object group has the same heat rank, and
  for each given object group:
    generating complex object metadata including information identifying the data objects making up the given object group,
    composing, at a first node, a complex object including the data objects of the given object group and the complex object metadata associated with the given object group,
    determining a cold rank complex object subset of the complex objects such that each complex object of the subset is made up of a plurality of data objects having a heat rank that is below a predetermined threshold, and
    transmitting, from the first computing to a second computing device, the complex objects of the cold rank complex object subset.

12. The CS according to claim 11 wherein the plurality of N blocks making up each data object have consecutive Logical Block Addresses.

13. The CS according to claim 12 wherein N is equal to four.

14. The CS according to claim 11, wherein each given data object's heat rank is the number of accesses to which the given data object has been subject.

15. The CS according to claim 11 wherein the computer code further includes instructions for causing the processor(s) set to perform the following operations:
  receiving, by the second computing device, over a communication network and from the first computing device, the complex objects of the cold rank complex object subset; and
  for each given complex object of the cold rank complex object subset:
    decomposing, by the second computing device, the given complex object into its constituent plurality of data objects, and
    storing the constituent plurality of data objects.

* * * * *